(12) United States Patent
Marioni (10) Patent No.: US 8,164,286 B2
(45) Date of Patent: Apr. 24, 2012

(54) METHOD FOR STARTING A PERMANENT MAGNET SINGLE-PHASE SYNCHRONOUS ELECTRIC MOTOR AND ELECTRONIC DEVICE FOR IMPLEMENTING SAID METHOD

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 0 days.

(21) Appl. No.: 13/159,204

(22) Filed: Jun. 13, 2011

(65) Prior Publication Data

US 2012/0019180 A1    Jan. 26, 2012

(30) Foreign Application Priority Data

Jul. 23, 2010    (EP) .................................... 10425250

(51) Int. Cl.
*H02P 6/18* (2006.01)
*H02P 6/22* (2006.01)

(52) U.S. Cl. ........... 318/400.11; 318/400.17; 318/400.2; 318/400.41

(58) Field of Classification Search .................. 318/700, 318/400.01, 400.03, 400.05, 400.09, 400.11, 318/400.17, 400.2, 400.32, 400.34, 400.41, 318/430, 431

See application file for complete search history.

(56) References Cited

U.S. PATENT DOCUMENTS

| | | | |
|---|---|---|---|
| 5,142,214 A | 8/1992 | Purson et al. | |
| 6,239,563 B1 * | 5/2001 | Kunz | 318/400.07 |
| 7,948,193 B2 * | 5/2011 | Komatsu et al. | 318/400.01 |
| 2009/0174356 A1 * | 7/2009 | Lu | 318/430 |
| 2010/0188037 A1 | 7/2010 | Acquaviva et al. | |
| 2010/0225260 A1 * | 9/2010 | Gerfast | 318/400.11 |

FOREIGN PATENT DOCUMENTS

| | | |
|---|---|---|
| DE | 4033121 A1 | 4/1991 |
| EP | 0909013 A2 | 4/1999 |
| EP | 0945973 A2 | 9/1999 |
| WO | 2009/001291 A2 | 12/2008 |

* cited by examiner

*Primary Examiner* — Bentsu Ro (74) *Attorney, Agent, or Firm* — Akerman Senterfitt

(57) ABSTRACT

Method for starting a single-phase synchronous electric motor using permanent magnets with simple and cost-effective implementation, said method comprising a step of application of a control logic of the switch that provides a first and a second condition for switching on:

the first condition being verified when a detected counter electromotive force signal has the same sign as an electrical grid voltage signal;

the second condition being verified when said counter electromotive force signal has the same sign as its first derivative value.

15 Claims, 9 Drawing Sheets

METHOD FOR STARTING A PERMANENT MAGNET SINGLE-PHASE SYNCHRONOUS ELECTRIC MOTOR AND ELECTRONIC DEVICE FOR IMPLEMENTING SAID METHOD

CROSS-REFERENCE TO RELATED APPLICATIONS

The present application claims priority to European Patent Application No. 10425250.7, filed Jul. 23, 2010, the entirety of which is incorporated herein by reference.

FIELD OF APPLICATION

The present invention refers, in its most general aspect, to a method for starting a single-phase permanent magnet synchronous electric motor, as well as to an electronic device able to be associated with an electric motor to implement said starting method.

In particular, the method concerns the starting of single-phase synchronous electric motors used in applications characterised by a great need to reduce cost and bulk. For example, it concerns the starting of electric motors used in domestic appliances such as washing machines and dishwashers.

PRIOR ART

As known, synchronous motors, whilst benefiting from a high energy efficiency and excellent stability of the operating speed, have a substantial drawback linked to their difficulty in starting.

Indeed, during the starting step the rotor must be brought from zero speed to a condition of frequency coupling with the power supply source of the machine. In practice, in order to allow said frequency coupling mechanical and/or electronic technical provisions are adopted, which of course involve a substantial production and installation cost.

In particular, the electronic systems include the use of circuits consisting of inverter and chopper, which allow the frequency and the wave amplitude of the grid voltage to be easily varied, changing them during the starting step.

On the other hand said circuits, whilst satisfactorily solving the problem of starting the motor, have a high degree of complexity and thus substantially affect the overall cost of the device. Indeed, they have been developed and optimised for three-phase machines, and they are excessively onerous and unsuitable for controlling two-phase synchronous motors and above all low-power single-phase synchronous motors.

In the operation of poly-phase motors, the various windings relative to the different phases are not always simultaneously fed by the current. Therefore, there is often at least one coil not fed across which to carry out a measurement of the counter electromotive force generated by the machine. Thanks to said measurement it is possible to estimate the position of the rotor even without the help of specific sensors, which allows the starting to be controlled with electronic systems of sufficiently low cost. However, such a solution cannot be implemented on single-phase motors, given that the counter electromotive force on them cannot be obtained when the current in the phase winding is different from zero.

Moreover, precisely single-phase motors, in particular in the embodiment with permanent magnets, are particularly widely used on the market thanks to their low production cost. Currently, their starting is generally facilitated with mechanical provisions, precisely to keep their cost within acceptable limits. The mechanical provisions used for the purpose do however bring further problems of energy efficiency and noise.

The technical problem forming the basis of the present invention is, therefore, to devise a starting method and a respective electronic device for its implementation that allow effective starting of single-phase synchronous motors using permanent magnets, with low production and installation costs.

SUMMARY OF THE INVENTION

The aforementioned technical problem is solved by a method for starting a single-phase synchronous electric motor comprising a permanent magnet rotor and a stator provided with windings connected to an electrical grid by means of a switch.

Such a method comprises at least one step of application of a control logic of said switch, which employs two conditions for switching on aimed at ensuring that the current circulating in the windings is mainly (i.e. most of the time) of the same sign as the counter electromotive force generated by the electric motor.

Hereafter we shall briefly explain why such a sign ensures good starting of the electric motor.

The driving torque $C_M$ developed instantaneously by the current in the windings is given by the product:

$$C_M = -i(t) \cdot \Phi \cdot \sin(\theta(t))$$

where $\Phi$ is the peak value of the flow induced by the magnet in the windings and $\theta$ is the angular displacement of the rotor.

On the other hand, the counter electromotive force is:

$$fcem = -\Phi \omega_m \cdot \sin(\theta(t))$$

hence:

$$C_M \cdot \omega_m = fcem \cdot i(t)$$

In order to obtain a torque value $C_M$ in accordance with the rotation speed $\omega_m$, i.e. to ensure a driving torque and not a braking torque during starting, it is thus necessary as stated above for the current circulating in the windings to be of the same sign as the counter electromotive force.

The first condition for switching on the switch is verified when a detected counter electromotive force signal has the same sign as an electrical grid voltage signal, whereas a second condition is verified when said counter electromotive force signal has the same sign as its first derivative value.

The control logic described above, also able to be actuated in sensorless mode with low-cost components, allows simple and effective starting of a single-phase synchronous electric motor.

The counter electromotive force signal can indeed be easily obtained without the help of sensors, for example as the difference between the electrical grid voltage and the voltage across the switch in the periods in which the current fed to the windings is zero. The zero current condition can be evaluated by making sure that the voltage across the switch is sufficiently different from zero, or else through a shunt resistance.

Moreover, given that the control logic described above controls just the conditions for switching on the switch, for its implementation the switch used can be a simple TRIAC switch, which interrupts the electrical connection at the moment when the current passes through zero.

A more elaborate control logic, comprising a condition for switching off the switch when there is a difference in sign between current and counter electromotive force, would on the other hand require a switch such as to allow the interruption of the current, as well as suitable circuits to absorb the energy dissipated in the inductance of the stator windings. Such a logic would also require the acquisition of the current signal and the estimation of the counter electromotive force, through the implementation of complex circuits, also in the moments when current circulates in the windings.

Actually, however, the second condition of the control logic according to the present invention prevents situations with stator current that is different from the counter electromotive force, making the switched off condition of the switch superfluous and substantially simplifying the control architecture and its implementation.

The verification of said first condition can easily be implemented by applying an XNOR logic operation to a squared signal of the counter electromotive force and to a grid synchronisation signal.

The second condition can also be easily verified by applying an XNOR logic operation to a squared signal of the counter electromotive force and to a squared signal of the first derivative of the counter electromotive force.

Alternatively, the first and the second condition can be simultaneously verified by applying an XNOR logic operation between the grid synchronisation signal and a second squared signal, obtained from the sum between the counter electromotive force signal and the signal of its first derivative suitably scaled.

Since the first derivative of the counter electromotive force is in advance of this, the squared sum of the two signals is also in advance of the squared signal of just the counter electromotive force; said advance increases with the scale factor attributed to the first derivative; the threshold squaring value also makes it possible to delay the rising edge and bring forward the falling edge; with just two parameters it is thus possible to set the range in which the switched on condition is allowed, according to the requirements of the situation (moment of inertia, hydraulic-mechanical load, risk of demagnetisation . . . ).

The switching on of the switch can be brought forward with respect to the occurrence of the first condition of the control logic, and it is possible for the switch to be switched on slightly in advance of the moment when the counter electromotive force changes sign going to take up the same sign as the grid voltage.

Such a solution is possible considering the link of the torque with the sine of position angle of the rotor and the delay of the current signal with respect to the voltage signal in the ohmic-inductive circuit represented by the stator windings. All the while the position angle is opposite, the braking torque is negligible. The switching on in advance does however provide the circuit with more time to allow the current to grow, so as to exploit said current when the sine of the position angle has become broadly the same.

In order to avoid the second condition inhibiting the switching on of the switch in the case of local slowing down due to the togging torque or to the load of the motor, it is possible to relax the aforementioned second condition allowing the switch to be switched on even when, although the counter electromotive force signal has taken up a different sign to its first derivative value, the peak value of the counter electromotive force signal coinciding with the last variation in sign of its first derivative has a modules below a threshold value.

The second condition of the control logic indeed wants to inhibit the switching on of the switch when the rotor pole is approaching the stator pole, a situation that preludes a change in sign of the counter electromotive force.

The aforementioned local slowing down can however cause a negative first derivative of the signal without said critical condition necessarily occurring. Such a circumstance can however be recognised from the fact that the absolute value of the counter electromotive force peak, prior to the occurrence of the slowing down itself, takes up low values, normally less than 20% of the counter electromotive force peak at nominal speed. This is why if said value does not reach a certain threshold, the control logic can advantageously provide the switching on of the TRIAC switch contravening the previous indications.

The method according to the present invention can also comprise a step, prior to that of application of the control logic, of feeding the stator windings in current with a series of starting impulses of the same sign intended to start the rotor overcoming the cogging torque.

The subsequent step of application of the control logic is thus only started once a predetermined threshold of the counter electromotive force signal has been exceeded.

It should be noted that, since the starting step is set up for when the pulling back of the cogging torque has been exceeded, the threshold of the control parameter is selected so as to initiate the transition step within a rotation angle of the rotor equal to the angle subtended between two successive interpolar axes of the stator. In the specific case of a single-phase motor with two poles, the control logic is thus initiated within the first 180° of rotation of the rotor.

In particular, it is advantageously possible to establish that the logic be applied when the counter electromotive force exceeds a threshold value of between 10% and 20% of the peak value of the counter electromotive force at normal operating speed.

The method according to the present invention can also comprise a preliminary step of feeding the windings in current with a series of alignment impulses of different sign to said starting impulses intended to bring the rotor into a predetermined starting position.

Given that the rotor has two different equilibrium positions, the realignment operation described above allows there to be the certainty that the successive starting impulses promote a rotation of the rotor, without it being necessary to use position sensors.

The method can thus advantageously comprise a waiting step, after the feeding of the alignment impulses and before the feeding of the starting impulses. Said waiting step lasts long enough to ensure the stabilisation of the rotor, which could be subject to bedding vibrations after realignment.

The starting impulses, just like the alignment impulses, can be delayed by an initiation angle with respect to the variation in sign of the electrical grid voltage.

Such an initiation angle can advantageously be adapted to the grid voltage, to the moment of inertia of the rotor and to the position thereof so as to obtain the maximum acceleration and at the same time prevent the demagnetisation of the rotor.

In particular, it has been seen how it is advantageous to decrease the initiation angle during the series of starting impulses, which thus have progressively increasing intensity.

The aforementioned technical problem is also solved by an electronic device for starting a synchronous motor comprising a processing unit, a switch for feeding said synchronous motor controlled by said processing unit, said processing unit receiving a grid voltage signal and a voltage signal across the switch, said electronic device being arranged to implement the method described above. As stated earlier, the switch can be a switch of the TRIAC type.

Further characteristics and advantages of the present invention will become clear from the following description of a preferred embodiment, given for indicating and not limiting purposes with reference to the attached drawings.

DETAILED DESCRIPTION

Figure 1:
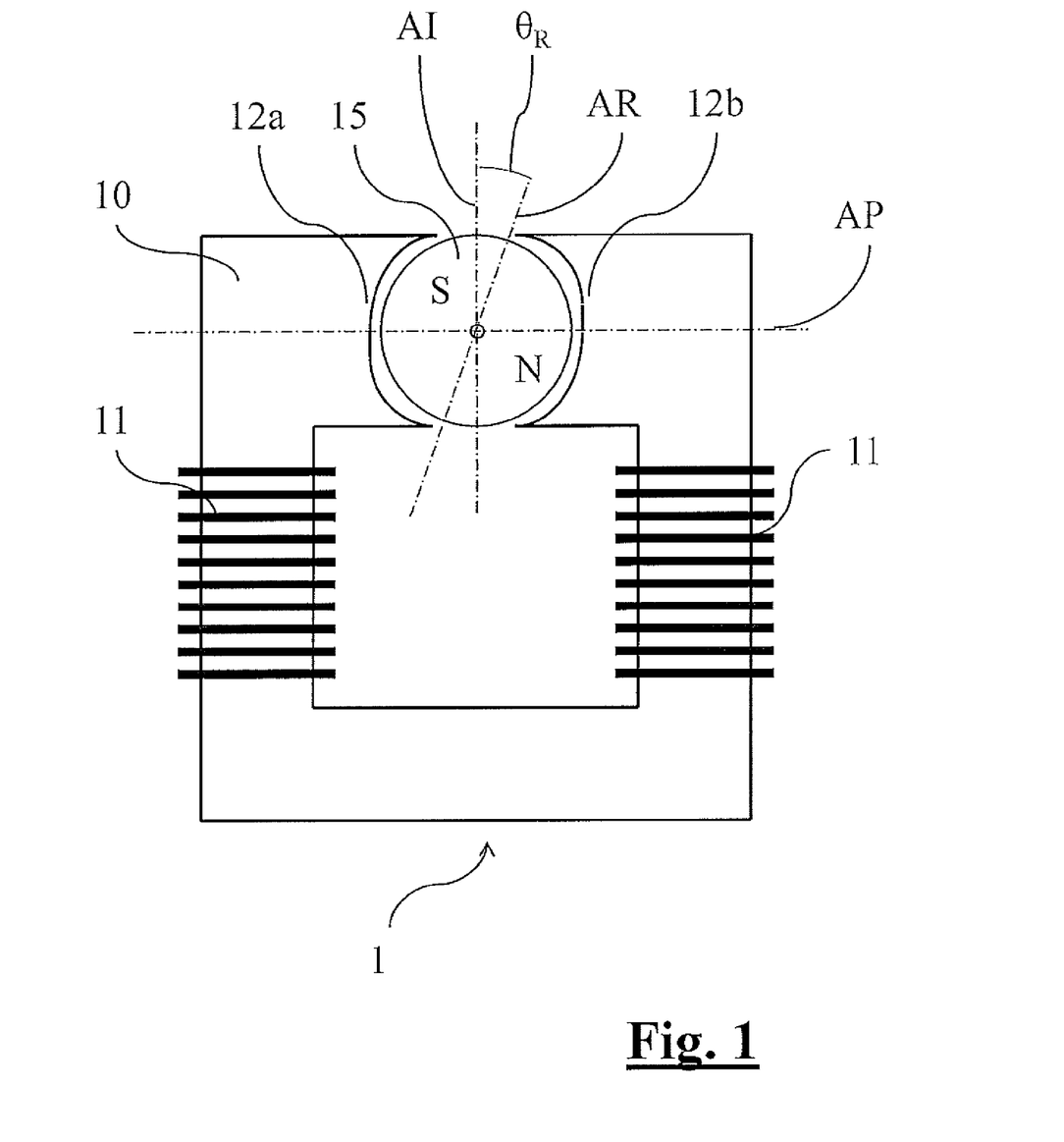
FIG. 1 schematically represents a synchronous electric motor controlled with a starting logic according to the present invention.

With reference to the attached FIG. 1, reference numeral 1 identifies a single-phase synchronous motor using permanent magnets, comprising a stator 10 and a cylindrical rotor 15 able to rotate with respect to it.

The stator 10 defines a magnetic circuit that closes on the rotor 15, rotatably arranged between a first 12a and a second 12b polar expansion of the stator itself. The stator has two windings 11 fed by an electronic device 20.

The rotor 15 comprises a permanent magnet arranged so as to define two diametrically opposite magnetic poles on the outer periphery of the element. With the term rotor axis AR we shall define a diameter of the rotor lying on the ideal plane of separation between the poles thus defined.

The polar expansions 12a, 12b, arranged according to a polar axis AP of the stator 10, are distinguished by a morphological asymmetry, so that the rotor 15 at rest is arranged with rotor axis AR inclined by an angle of asymmetry θR with respect to an interpolar axis AI of the stator 10. Such asymmetry as known ensures the unidirectional starting of the synchronous motor. In the present example the rotor axis AR is inclined by about 6° with respect to the interpolar axis in the anti-clockwise direction, thus promoting a starting of the rotor in the same direction.

Figure 2:
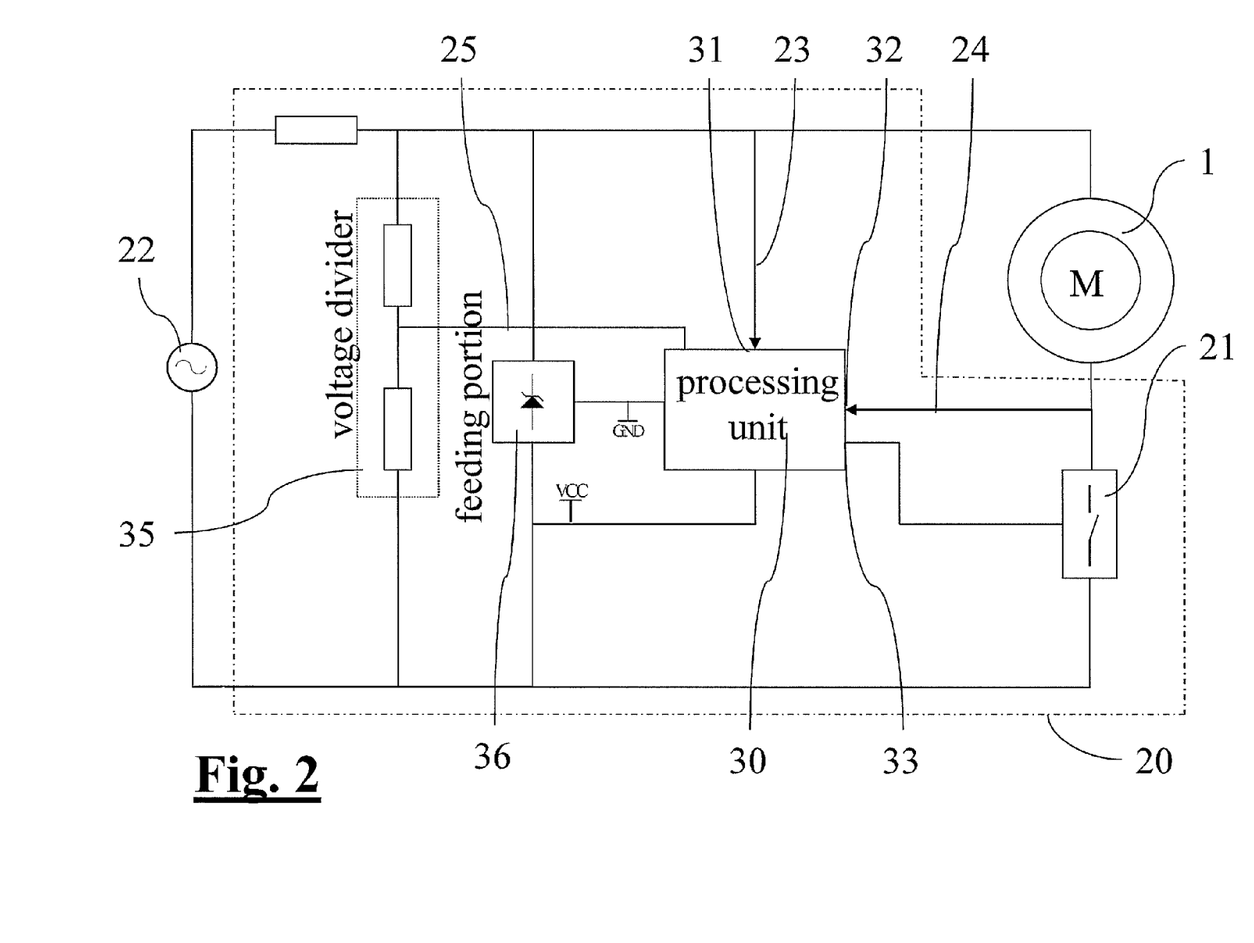
FIG. 2 schematically represents an electronic device according to the present invention applied to the synchronous electric motor of FIG. 1.

The electronic device 20, which preferably takes up the form of a control board, has a static switch 21, in this specific case a TRIAC switch, arranged to adjust the power supply to the stator windings 11, supplied by an electrical grid 22 in alternating current.

The TRIAC switch 21 is connected to a PWM output 33 of a processing unit 30, which preferably takes up the form of a microprocessor. Said processing unit 30 implements the method for starting the synchronous motor 1 described hereafter.

The processing unit 30 has a first input 31, which receives a grid voltage signal 23, and a second input 32, which, on the other hand, receives a voltage signal 24 on the switch.

By processing such signals, the processing unit 30 is able to carry out an indirect measurement of the counter electromotive force generated by the synchronous motor 1, obtained as the difference between the grid voltage signal 23 and the voltage signal 24 on the switch, at the moments when the current is zero. The control unit 30 detects said zero current condition still evaluating the voltage signal 24 on the switch, and in particular ensuring that such a signal is sufficiently far from the zero value.

From the counter electromotive force measurement in the zero current periods, the processing unit 30 can estimate the time profile of said force. It thus generates a squared counter electromotive force signal 26, which takes up the unitary value when the counter electromotive force is positive, otherwise it is zero; and a squared first derivative signal of the counter electromotive force 27, unitary when the function of the counter electromotive force has a positive derivative, otherwise it is zero.

The electronic device 20 also has a portion 35 for the synchronisation with the power supply grid that obtains a grid synchronisation signal 25, i.e. a signal having a unitary value when the voltage of the electrical grid has positive values, zero when it takes up negative values, and sends it to the processing unit 30.

Figure 9:
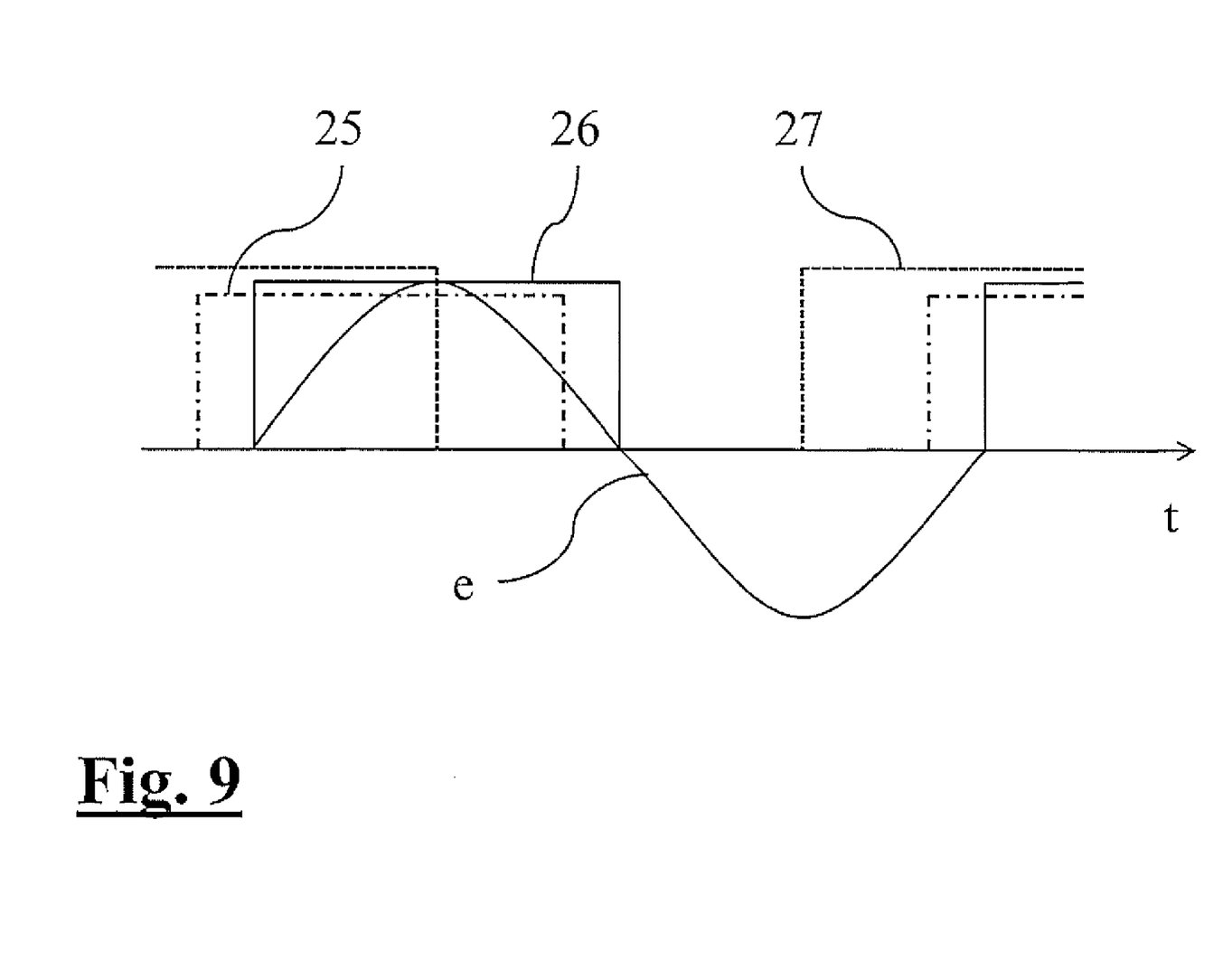
FIG. 9 shows the time profile of some signals used in the starting logic according to the present invention.

The time profile of the grid synchronisation signal 25, of the squared counter electromotive force signal 26 and of the squared gradient signal of the counter electromotive force 27 is schematically represented in comparison with the profile of the counter electromotive force and in FIG. 9.

The electronic device 20 again has a feeding portion 36 of the processing unit 30, also arranged to supply said unit with a voltage reference signal.

Figure 3:
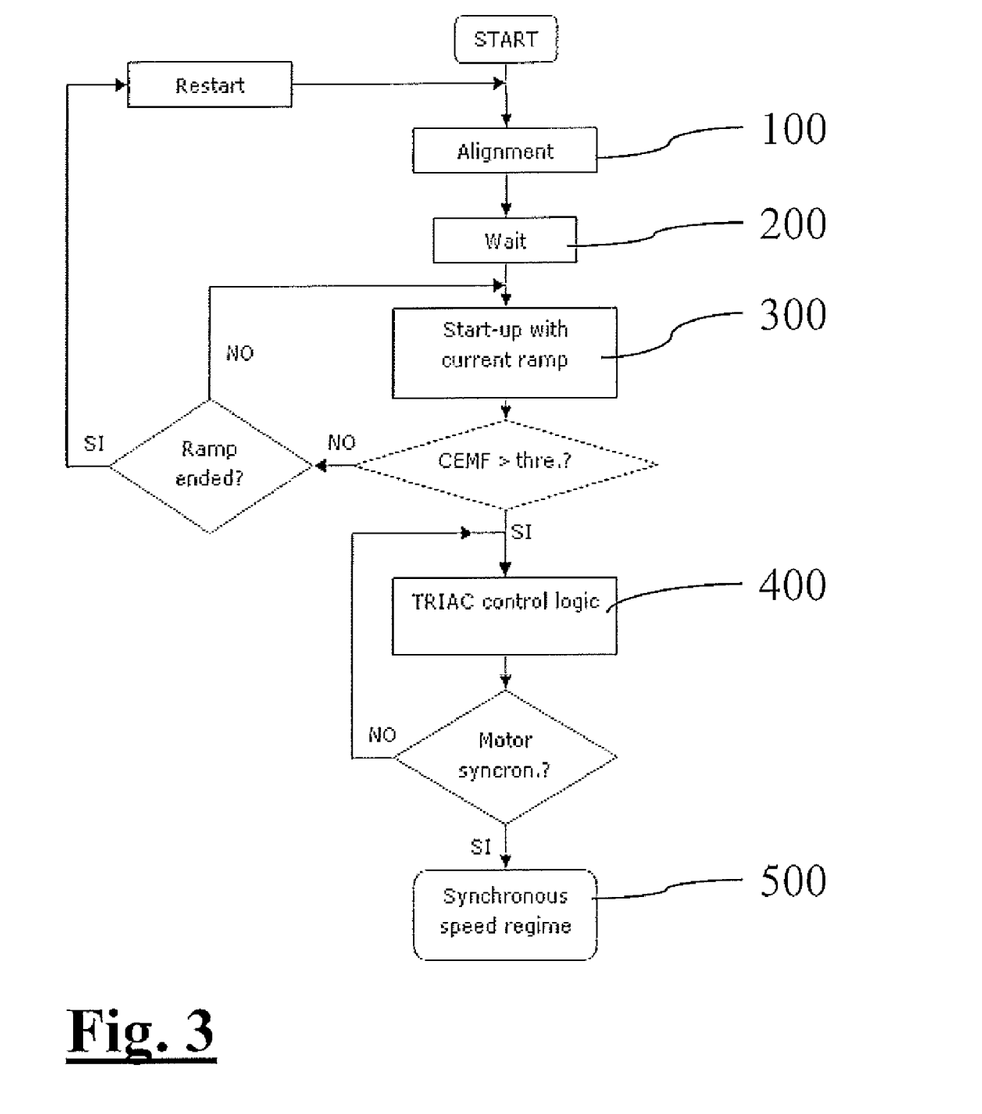
FIG. 3 presents a block diagram that illustrates the various steps of the starting method according to the present invention.

The starting of the synchronous motor 1 provides a first alignment step 100 aimed at bringing the rotor 15 into a predefined starting position.

In rest conditions, the rotor 15 is indeed arranged with the opposite polarities respectively facing the first 12a and the second polar expansion 12b. In order to facilitate the starting of the machine, it is however preferable to known the starting position with certainty.

In the present example such a predetermined starting position, illustrated in FIG. 1, sees the north pole of the rotor 15 facing the second polar expansion 12b of the stator 10.

In order to obtain this result, the electronic device 20 controls the TRIAC switch 21 so as to feed the windings 11 with a series of current impulses, here called alignment impulses 50, generated only during a determined half-period, positive or negative according to the selected starting position, of the voltage signal of the electrical grid 22. In application, the TRIAC switch must therefore only be switched on when the grid synchronisation signal 23 takes up a positive value (or negative according to the selected half-period).

In the case in which the position is not the preselected one for the start the alignment impulses 50 thus generated, thanks to the aforementioned inclination of the rotor axis AR with respect to the interpolar axis AI, promote a rotation of the rotor 15 towards the starting position.

On the other hand, if the rotor is already in the starting position, the alignment impulses 50 do not change its position.

The alignment impulses 50 can be advantageously modulated by the electronic device 20 through adjustment of the initiation angle α of the TRIAC switch 21, i.e. of the delay in switching on with respect to the passing through zero of the voltage of the electrical grid 22.

In particular, said initiation angle α can be adjusted based on the actual value of the grid voltage, the moment of inertia of the rotor and the position thereof so as to prevent demagnetisation phenomena of the permanent magnet whilst still ensuring the maximum acceleration of the rotor.

Figures 4A, 4B, 4C:
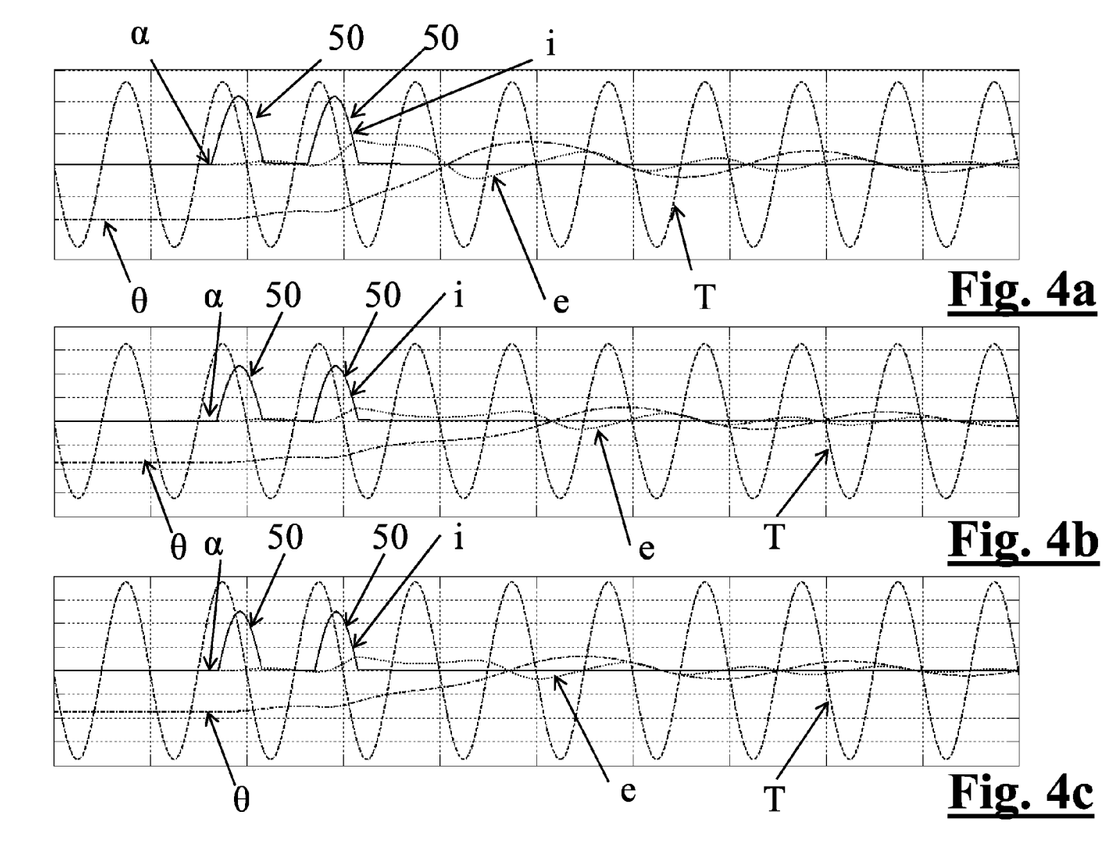
FIGS. 4a-4c show the time profile of some parameters relative to the synchronous motor of FIG. 1 during a first step of the starting method according to the present invention.

For illustrative purposes, FIGS. 4a-4c illustrate the time profile of the counter electromotive force e, of the grid voltage T, of the rotation angle of the rotor θ and of the stator current i during the course of the described alignment step 100. The three graphs refer to three implementations with progressively increasing actual values of the grid voltage.

In the present example, in order to take the rotor 15 into the predetermined starting position the electronic device 20 generates two alignment impulses 50 switching on the TRIAC switch 21 with initiation angle α with respect to the passing of the grid voltage from the negative half-period to the positive half-period (i.e. with respect to the updating to the unit of the grid synchronisation signal 25).

It should be noted that the delay in switching on the TRIAC switch 21 is suitably increased as the actual value of the grid voltage increases.

Once the alignment impulses 50 necessary to take the rotor into the starting position have been generated, the present method provides a waiting step 200 to allow the damping of possible oscillations of the rotor 15.

Indeed, in the case in which the impulses have actually changed the position of the rotor 15, the latter will oscillate for a certain period around the new rest position reached, coinciding with the preselected starting position. It is preferable to wait for the damping of such oscillations so as not to compromise the subsequent starting steps of the motor.

The waiting time of course depends upon various factors, first of all friction and moment of inertia of the rotor 15. A likely time for synchronous motors using permanent magnets of small size is in any case around 700 ms.

At the end of the waiting step, it is thus certain that the rotor 15 is stopped in the predefined starting position.

The subsequent step of the present method is the starting step 300. Such a step provides generating a second series of current pulses, here called starting impulses 60, generated this time in the half-period of the voltage signal of the electrical grid 22 opposite to that of the alignment impulses 50.

The starting impulses 60 generated preferably have increasing intensity. The intensity, as described for the alignment impulses 50, is always adjusted by varying the initiation angle α of the TRIAC switch 21.

Given the starting position of the rotor 15, it is certain that said starting impulses cause a rotation of 180° thereof.

Firstly, and in particular in the first $(90+\theta_R)°$ of movement (96° in the embodiment discussed here), the rotor 15 is braked by the cogging force that tends to bring it back towards the starting position. Thus the counter electromotive force, which increases during the starting impulses 60, goes back to zero at the end of every impulse, according to the known formula:

$$fcem = \frac{d\varphi}{dt} = -\Phi\omega_m \sin(\theta(t))$$

where φ is the instantaneous flow induced by the magnet in the windings 11, Φ is the peak value of such a flow, $\omega_m$ is the rotation speed of the rotor and θ is the angular displacement of the rotor.

The cogging force reaches its maximum value at a rotor angle of $(45+\theta_R)°$, where $\theta_R$ is the angle that the rotor takes up at rest (with zero current), whereas the torque due to just the effect of the current increases with sinusoidal profile up to 90°, and therefore beyond a certain angle the current impulse is such as to overcome the pulling back of the cogging force and the counter electromotive force substantially increases going to exceed a control threshold 70, inductively equal to 10-20% of its maximum value in normal operation.

The electronic device 20, between one starting impulse 60 and the next, thus monitors the profile of the counter electromotive force signal; when said signal exceeds the control threshold 70, the electronic device 30 passes to a new control logic of the motor described hereafter.

Figure 5:
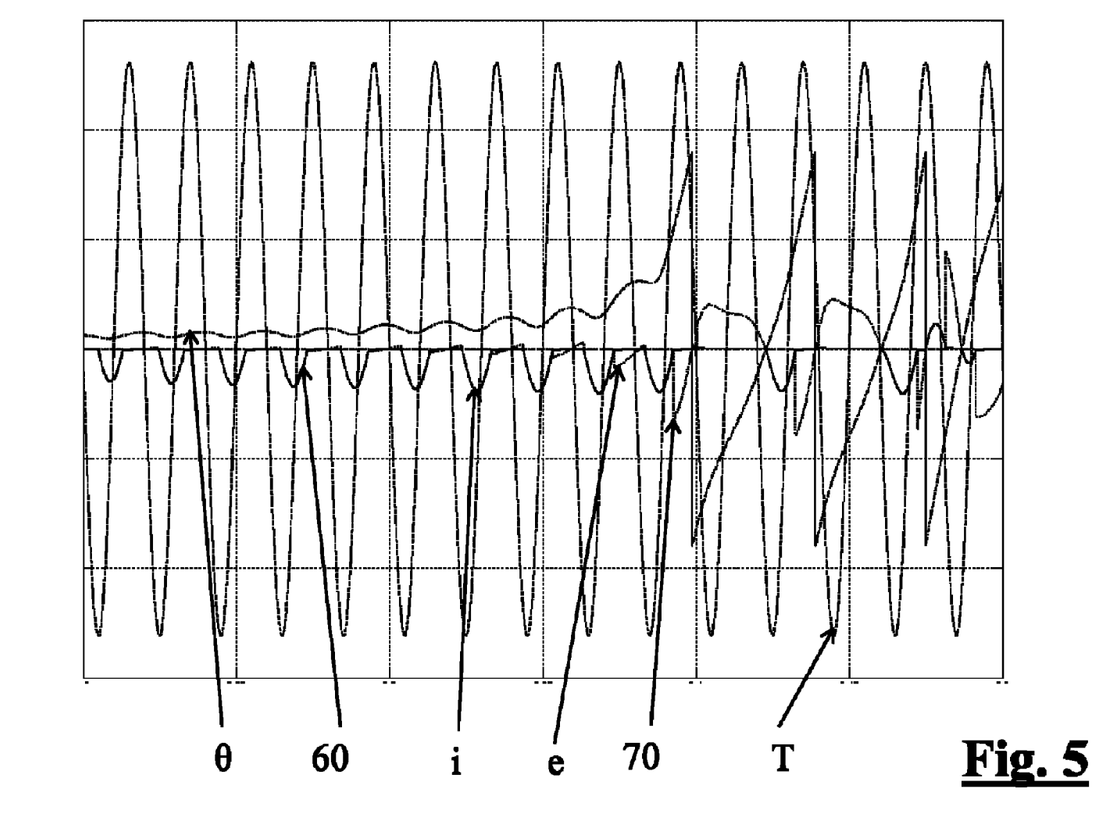
FIG. 5 shows the time profile of some parameters relative to the synchronous motor of FIG. 1 during a second step of the starting method according to the present invention.

FIG. 5 illustrates the time profile of the counter electromotive force e, of the grid voltage T, of the rotation angle of the rotor θ and of the stator current i during the course of the described starting step 300.

The method according to the present invention thus comprises a step of application of a control logic 400, which determines a transition towards normal operation of the electric motor 1.

In this last step, the electronic device 20 controls the TRIAC switch 21 allowing it to be switched on only when both of the following conditions occur:
 a) the estimated counter electromotive force signal must have the same sign as the grid voltage (first condition);
 b) the estimated counter electromotive force signal must be going away from zero (second condition).

The first condition is implemented by the electronic device 20 through an XNOR operation carried out on the grid synchronisation signal 25 and on the squared counter electromotive force signal 26.

The second condition is implemented again through an XNOR operation between the squared counter electromotive force signal 26 and the squared first derivative signal of the counter electromotive force 27. The XNOR operation gives a positive result if the two operators have the same value, i.e. if the sign of the first derivative is the same as that of the function; analytical condition that defines the function going away from zero.

Figure 6:
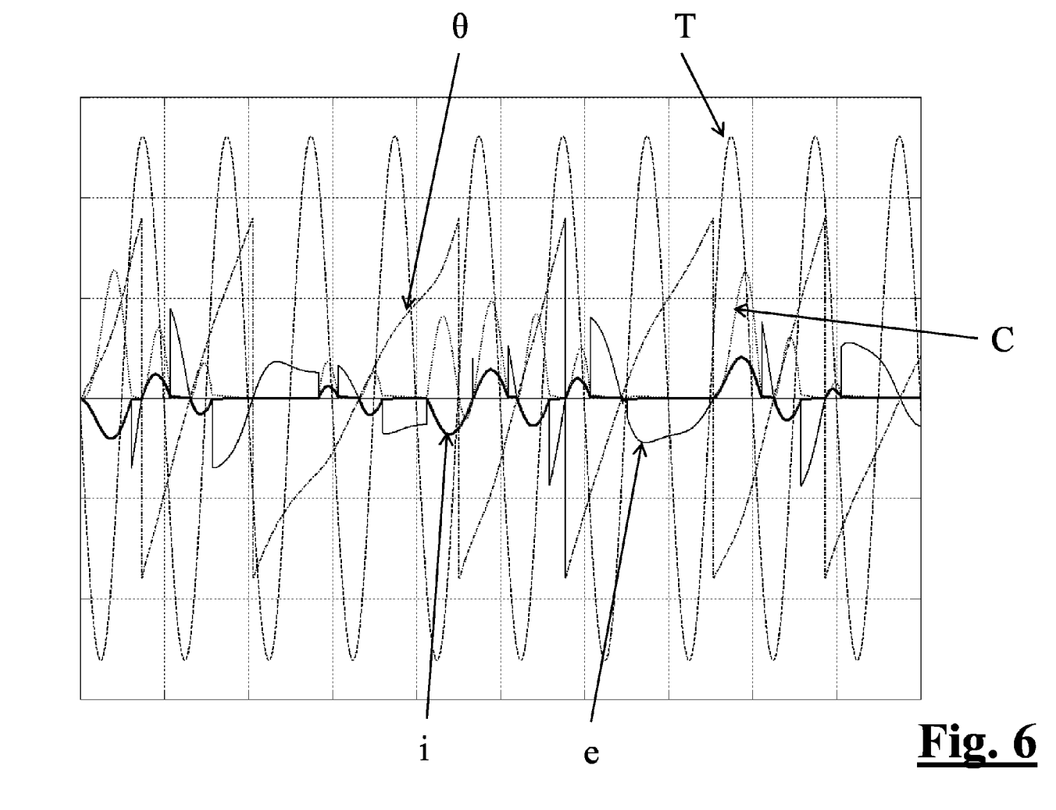
FIG. 6 shows the time profile of some parameters relative to the synchronous motor of FIG. 1 during a third step of the starting method according to the present invention.

FIG. 6 illustrates the time profile of the counter electromotive force e, of the grid voltage T, of the rotation angle of the rotor θ and of the stator current i during the course of the step of application of the described control logic 400.

The aforementioned switching on logic tends to keep the TRIAC switch 21 in conduction only when the transit of current in the windings 11 determines a driving torque in the direction of rotation of the rotor 15, as will become clearer from the considerations formulated hereafter.

The driving torque developed by the stator current is given by the product:

$$C_M = -i(t) \cdot \Phi \cdot \sin(\theta(t))$$

whereas the counter electromotive force is:

$$\theta cem = -\Phi\omega_m \cdot \sin(\theta(t))$$

hence:

$$C_M \cdot \omega_m = fcem \cdot i(t)$$

In order to obtain a driving torque value $C_M$ that is the same as that of $\omega_m$ it is thus necessary for the current circulating in the windings to also be of the same sign as the counter electromotive force.

Based on such a consideration an advantageous control logic of the motor could provide the switching on of the feeding switch when the counter electromotive force and the grid voltage take up the same sign (first condition of the switching on logic actually implemented), and its switching off when counter electromotive force and current take up different signs. If the switch used allows the current to be switched off almost instantaneously, such a control logic develops a driving torque oriented in the direction of rotation of the rotor 15, i.e. never braking.

On the other hand, however, such a control logic, which we shall call switching on/off logic to distinguish it from just the switching on logic actually implemented, cannot be replicated by the electronic device 30 according to the embodiment described here. Indeed, it does not provide an input for the current signal necessary to detect the switching off condition, and also uses a TRIAC switch 21 that is not able to carry out such switching off adequately.

The just switching on logic actually replaces the control for switching off with the second switching on condition. In this way, the TRIAC switch 21 is not switched on in the case in which the periodic profile of the counter electromotive force has already exceeded its peak, given that in such a case the variable is in the process of changing sign and would soon be different from the current impulse generated by the switching on of the switch. In other words, the second condition a priori avoids the occurrence of the conditions that would lead to switching off according to the switching on/off logic.

Thus, thanks to the second condition, the just switching on logic avoids generating braking torques on the rotor 15 of the synchronous electric motor 1.

It should be noted that the first condition of the just switching on logic can be modified by allowing early switching on of the switch 21 when the counter electromotive force, different from the grid voltage, is in the process of changing sign. In this case, the first condition allows the switching on of the switch 21 when the counter electromotive force signal, even if of different sign to the grid voltage, is approaching the zero value and has an absolute value below a predetermined threshold.

If the permitted advance action is not excessive, the condition does not significantly affect the matching sign between counter electromotive force and current, even considering the fact that the current still has a delay with respect to the grid voltage. In this way the current peak comes earlier facilitating starting.

Figure 8:
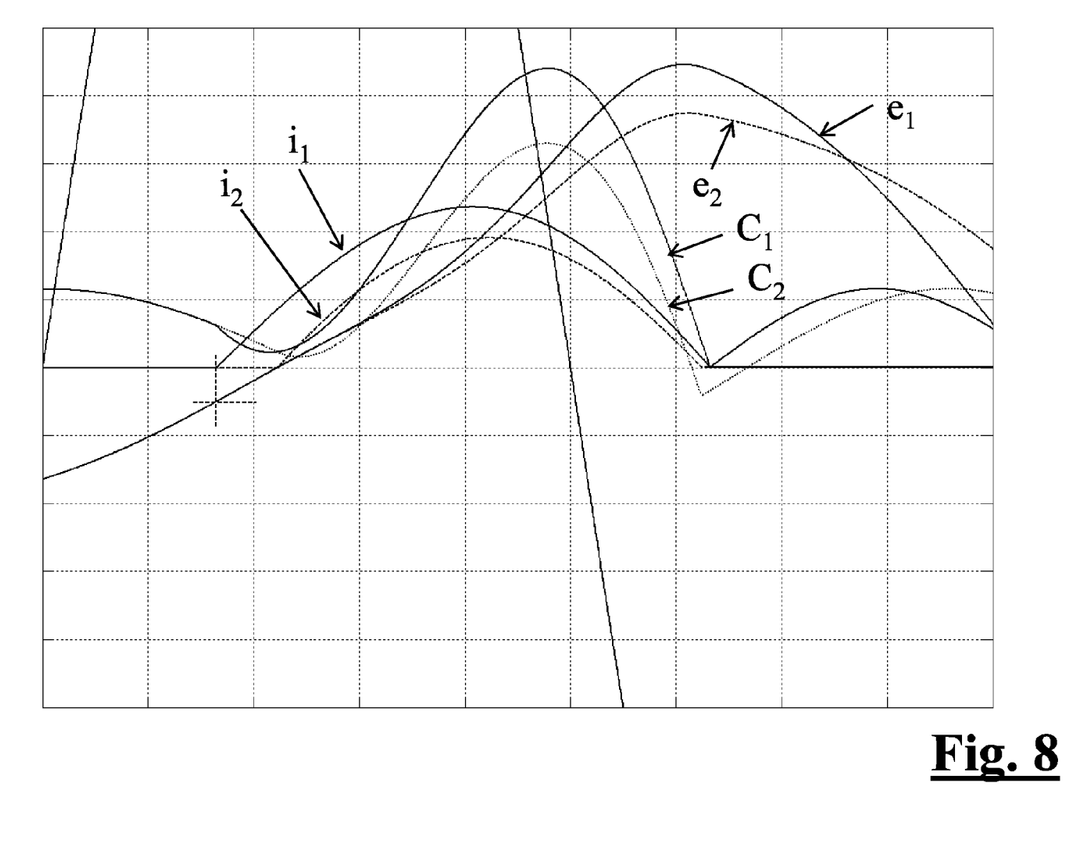
FIG. 8 compares the time profile of some parameters relative to the synchronous motor of FIG. 1 during a third step of two alternative embodiments of the starting method according to the present invention.

FIG. 8 compares the time profile of the counter electromotive force e, of the stator current i and of the torque C during the application of the control logic with or without early starting. The values relative to the early starting are identified by the subscript 1, and those that refer to the non-early starting take the subscript 2.

It should also be noted that the second condition of the just switching on logic can inhibit the switching on of the switch 21 also with slowing down of the rotor 15 that does not correspond to an absolute peak of the counter electromotive force, for example slowing due to cogging torque or to the load on the rotor. In this case the condition proves excessively restrictive given that the current impulse generated would have developed a driving torque on the rotor 15.

Figure 7:
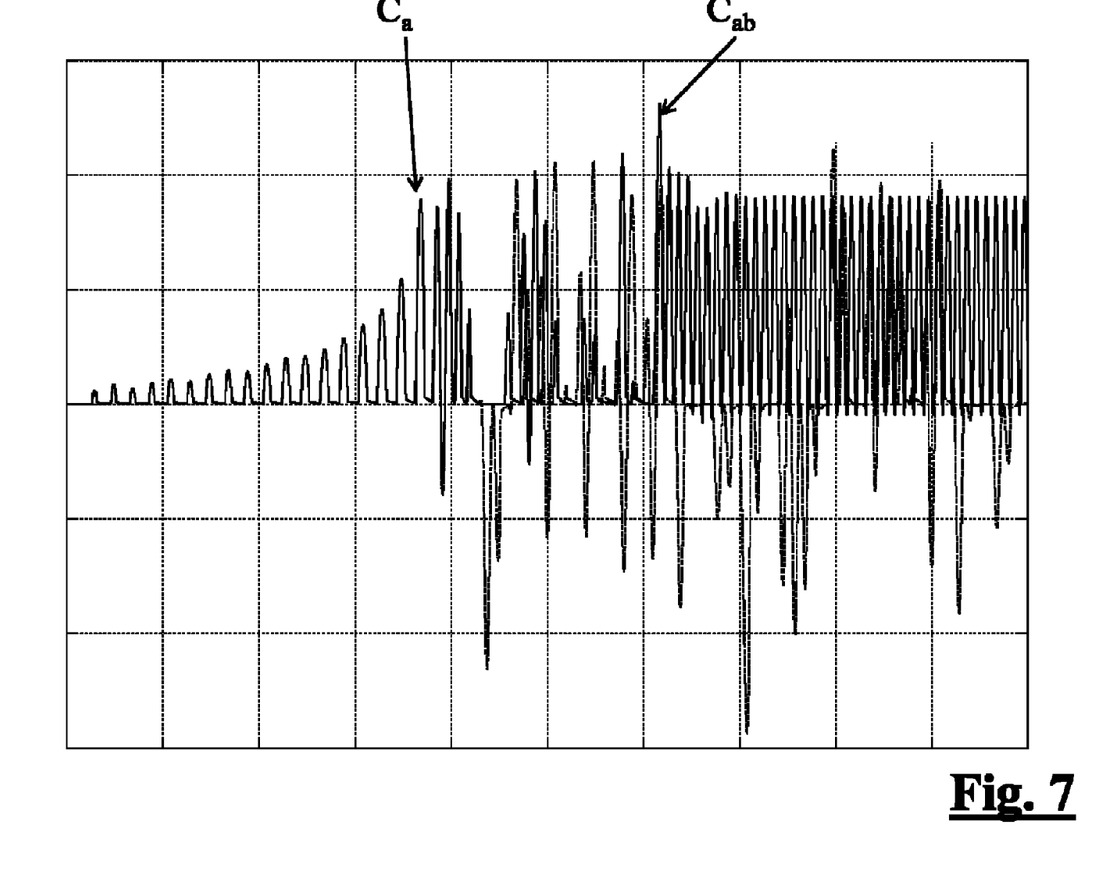
FIG. 7 compares the time profile of the driving torque developed during a third step of two alternative embodiments of the starting method according to the present invention.

Other than the possibility of using the provisions mentioned in the summary of the invention aimed at limiting such a drawback, we note how the second condition in any case, despite the undesired inhibitions, substantially improves the performance of the motor in starting. Regarding this let us consider FIG. 7, which compares the torque $C_a$ developed applying just the first condition of the switching on logic and the torque $C_{ab}$ developed applying both of the conditions of the logic.

Once the synchronised condition of the synchronous motor 1 has been reached, the starting is completed and the motor is at normal operating speed.

The described method and device make it possible to start a synchronous electric motor keeping low starting voltages, high efficiency at normal operating speed and lower costs of the active parts. This translates into a substantial economic advantage given that it allows the amount or the efficiency of the active material used for the stator windings to be reduced. Moreover, the stator pack can have a lower thickness, which means lower costs and bulk.

Another advantage of the method and of the device described derives from the fact that they allow the starting voltages necessary to start the single-phase synchronous motor using permanent magnets to be reduced. In this type of machines, indeed, the starting voltage is generally greater than the normal operating voltage, which optimises efficiency. Such a restriction forces the designer to provide a sufficiently low number of coils to ensure starting, penalizing efficiency. The reduction of the necessary starting torque thus makes it possible to increase the number of coils of the windings to the great benefit of efficiency and thermal drift.

A further advantage of the starting logic described above derives from the fact that it prevents demagnetization phenomena of the permanent magnet of the rotor.

Such phenomena can occur when a high stator magnetic field opposes the field of the permanent magnet, i.e. when the rotor is aligned or almost aligned with the polar axis and the current circulating in the stator windings is high.

In the method outlined above, during the alignment steps, such a condition is prevented by the fact that the initiation angle $\alpha$ delays the switching on of the current precisely near to potentially dangerous rotor configurations In the transition step the control logic can switch on the switch near to the changes in sign of the counter electromotive force, which correspond to the critical alignment position with the polar axis of the rotor. During the time necessary for the current to reach dangerous levels, however, the rotor moves sufficiently far away from the alignment position. Also in this case there is thus no risk of demagnetization of the permanent magnet.

Of course, a man skilled in the art can bring numerous modifications and variants to the method and to the washing machine described above, in order to satisfy contingent and specific requirements, all of which are covered by the scope of protection of the invention as defined by the following claims.

The invention claimed is:

1. A method for starting a single-phase synchronous electric motor comprising a permanent magnet rotor and a stator provided with windings connected to an electrical grid by means of a switch, said method comprising:
    at least one step of applying a control logic of said switch;
    said control logic providing a first and a second condition for switching on said switch, said first and second condition having the purpose of ensuring that, during the application of said control logic, the current circulating in the windings is mainly of the same sign as the counter electromotive force generated by the electric motor;
    verifying said first condition when a detected counter electromotive force signal has the same sign as an electrical grid voltage signal; and verifying said second condition when said counter electromotive force signal has the same sign as its first derivative value.

2. The method according to claim 1, wherein the first condition for switching on the switch is verified by applying an XNOR logic operation to a squared signal of the counter electromotive force and to a grid synchronisation signal.

3. The method according to claim 1, wherein the second condition is verified by applying an XNOR logic operation to a squared signal of the counter electromotive force and to a squared signal of the first derivative of the counter electromotive force.

4. The method according to claim 1, wherein the first and the second condition are simultaneously verified by applying an XNOR logic operation to a grid synchronisation signal and to a second squared signal, obtained from the sum between the counter electromotive force signal and the signal of its first derivative suitably scaled.

5. The method according to claim 1, wherein, during the application of said control logic, the switching on of the switch is in advance of said first condition occurring.

6. The method according to claim 1, wherein said second condition is also verified when, even though the counter electromotive force signal has taken up a different sign to its first derivative value, the peak value of the counter electromotive force signal coinciding with the last variation in sign of its first derivative has an absolute value below a threshold value.

7. The method according to claim 1 also comprising a step, prior to that of application of the control logic, of feeding the stator windings in current with a series of starting impulses of the same sign intended to start the rotor overcoming the cogging torque.

8. Method according to claim 7, wherein said starting impulses have progressively increasing intensity.

9. The method according to claim 7, wherein the step of application of the control logic is started once a predetermined control threshold of the counter electromotive force signal has been exceeded.

10. The method according to claim 7, also comprising a preliminary step of feeding the windings in current with a series of alignment impulses of different sign with respect to said starting impulses intended to bring the rotor into a predetermined starting position.

11. The method according to claim 10, comprising a waiting step after the feeding of the alignment impulses and before the feeding of the starting impulses, said waiting step lasting long enough to ensure the stabilisation of the rotor.

12. The method according to claim 1, wherein the counter electromotive force signal is obtained as the difference between the electrical grid voltage and the voltage across the switch in period in which the current fed to the windings is zero.

13. The method according to claim 1, wherein the switch is a TRIAC switch.

14. An electronic device for starting a synchronous motor comprising a processing unit, a switch for feeding said synchronous motor controlled by said processing unit, said processing unit receiving a grid voltage signal and a voltage signal across the switch, said electronic device being arranged to implement the method according to claim 1.

15. The electronic device according to claim 14, wherein the switch is a switch of the TRIAC type.

* * * * *